(12) United States Patent
Liu

(10) Patent No.: US 11,138,992 B2
(45) Date of Patent: Oct. 5, 2021

(54) VOICE ACTIVITY DETECTION BASED ON ENTROPY-ENERGY FEATURE

(71) Applicant: TENCENT TECHNOLOGY (SHENZHEN) COMPANY LIMITED, Shenzhen (CN)

(72) Inventor: Jizhong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 112 days.

(21) Appl. No.: 16/665,260

(22) Filed: Oct. 28, 2019

(65) Prior Publication Data

US 2020/0058320 A1 Feb. 20, 2020

Related U.S. Application Data

(63) Continuation of application No. PCT/CN2018/116909, filed on Nov. 22, 2018.

(30) Foreign Application Priority Data

Nov. 22, 2017 (CN) .......................... 201711178373.8

(51) Int. Cl.
*G10L 25/93* (2013.01)
*G10L 15/22* (2006.01)
(Continued)

(52) U.S. Cl.
CPC .............. *G10L 25/93* (2013.01); *G10L 15/22* (2013.01); *G10L 25/18* (2013.01); *G10L 25/21* (2013.01);
(Continued)

(58) Field of Classification Search
USPC .................................. 704/231–257, 270–275
See application file for complete search history.

(56) References Cited

U.S. PATENT DOCUMENTS 9,123,351 B2 * 9/2015 Katagiri ................... G10L 25/78
9,886,960 B2 * 2/2018 Wang ..................... G10L 19/167
(Continued)

FOREIGN PATENT DOCUMENTS

| CN | 101625857 A | 1/2010 |
| CN | 102436821 A | 5/2012 |

(Continued)

OTHER PUBLICATIONS

Huang et al. "A Novel Approach to Robust Speech Endpoint Detection in Car Environments". Proceedings of IEEE International Conference on Acoustics, Speech, and Signal Processing, Jun. 2000, pp. 1751-1754 (Year: 2000).*

(Continued)

*Primary Examiner* — Jesse S Pullias
(74) *Attorney, Agent, or Firm* — Anova Law Group, PLLC

(57) ABSTRACT

This application discloses a voice activity detection method. The method includes receiving speech data, the speech data including a multi-frame speech signal; determining energy and spectral entropy of a frame of speech signal; calculating a square root of the energy of the speech signal and/or calculating a square root of the spectral entropy of the frame of the speech signal; determining a spectral entropy-energy square root of the frame of the speech signal based on at least one of the square root of the energy and the square root of the spectral entropy; and determining that the frame of the speech signal is an unvoiced frame if the spectral entropy-energy square root of the speech signal is less than a first threshold, or that it is a voiced frame if the spectral entropy-energy square root of the speech signal is greater than or equal to the first threshold.

20 Claims, 7 Drawing Sheets

(51) Int. Cl.
*G10L 25/18* (2013.01)
*G10L 25/21* (2013.01)
*G10L 25/84* (2013.01)

(52) U.S. Cl.
CPC ........ *G10L 25/84* (2013.01); *G10L 2025/937* (2013.01)

(56) References Cited

U.S. PATENT DOCUMENTS

| | | |
|---|---|---|
| 2002/0177170 A1 | 11/2002 | Luo et al. |
| 2009/0254341 A1* | 10/2009 | Yamamoto .............. G10L 25/78 704/233 |
| 2015/0081285 A1* | 3/2015 | Sohn, II .............. G10L 21/0232 704/219 |
| 2016/0260444 A1* | 9/2016 | Norvell .................. G10L 25/18 |
| 2016/0322066 A1* | 11/2016 | Sharifi .................. G06F 16/683 |

FOREIGN PATENT DOCUMENTS

| | | |
|---|---|---|
| CN | 104464722 A | 3/2015 |
| CN | 106356076 A | 1/2017 |
| CN | 106782593 A | 5/2017 |
| CN | 106920543 A | 7/2017 |
| CN | 107731223 A | 2/2018 |
| EP | 1569200 A1 | 8/2005 |

OTHER PUBLICATIONS

The State Intellectual Property Office of the People's Republic of China (SIPO) Office Action 1 for 201711178373.8 dated Mar. 20, 2020 9 Pages (including translation).

Rong-Rong Li et al., "Research of Speech Endpoint Detection Based on Spectral Entropy Algorithm", Journal of Wuhan University of Technology, vol. 35, No. 7, Jul. 2013, pp. 134-138 Total 6 Pages.

Jiong-Ning Sun et al., "Speech detection algorithm based on energy-entropy", Computer Engineering and Design, vol. 26 No. 12, Dec. 2005, pp. 3429-3431 Total 3 Pages.

The World Intellectual Property Organization (WIPO) International Search Report for PCT/CN2018/116909 dated Feb. 22, 2019 6 Pages (including translation).

* cited by examiner

VOICE ACTIVITY DETECTION BASED ON ENTROPY-ENERGY FEATURE

RELATED APPLICATIONS

This application claims priority to PCT Application No. PCT/CN2018/116909, filed on Nov. 22, 2018, which in turn claims priority to China Patent Application No. 201711178373.8, filed on Nov. 22, 2017, and entitled "VOICE ACTIVITY DETECTION METHOD, RELEVANT APPARATUS AND DEVICE", which are incorporated herein by reference in their entirety.

FIELD OF THE TECHNOLOGY

This application relates to the computer field, and in particular, to a voice activity detection method, a voice activity detection apparatus and a voice activity detection device.

BACKGROUND OF THE DISCLOSURE

Speech recognition is an interdisciplinary technical field. In the past two decades, the speech recognition technology has made great progress and started to move from laboratories to markets. As the speech recognition technology develops, its applications have expanded into applications of industry use, home appliances, communications, automotive electronics, medical care, home services and consumer electronics.

Voice activity detection (VAD), also known as speech activity detection, speech endpoint detection, or voice edge detection, is a technique used in speech data processing in which the presence or absence of a speech signal is detected. VAD is an important part of the speech recognition technology.

SUMMARY

To resolve the technical problems, an embodiment of this application discloses a voice activity detection method. The method includes receiving speech data, the speech data including a multi-frame speech signal; determining energy and spectral entropy of a frame of speech signal; calculating a square root of the energy of the speech signal and/or calculating a square root of the spectral entropy of the frame of the speech signal; determining a spectral entropy-energy square root of the frame of the speech signal based on at least one of the square root of the energy and the square root of the spectral entropy; and determining that the frame of the speech signal is an unvoiced frame if the spectral entropy-energy square root of the speech signal is less than a first threshold, or that the frame of the speech signal is a voiced frame if the spectral entropy-energy square root of the speech signal is greater than or equal to the first threshold.

An embodiment of this application discloses a voice activity detection apparatus. The apparatus includes a receiving unit, configured to receive speech data, the speech data comprising a multi-frame speech signal; a first calculating unit, configured to determine energy and spectral entropy of a frame of speech signal; a square root unit, configured to calculate a square root of the energy the frame of the speech signal and/or calculate a square root of the spectral entropy the frame of the speech signal; and determine a spectral entropy-energy square root of the frame of the speech signal based on at least one of the square root of the energy and the square root of the spectral entropy; and a determining unit, configured to determine that the speech signal is an unvoiced frame if the spectral entropy-energy square root of judging unit is less than a first threshold; or determine that the speech signal is a voiced frame if the spectral entropy-energy square root of the frame of the speech signal is greater than or equal to the first threshold.

An embodiment of this application discloses a voice activity detection device, including a processor and a memory connected to each other, the memory being configured to store application code, and the processor being configured to call the application code to execute the following operations including receiving speech data, the speech data comprising a multi-frame speech signal; determining energy and spectral entropy of a frame of speech signal; calculating a square root of the energy of the frame of the speech signal and/or calculating a square root of the spectral entropy the frame of the speech signal; determining a spectral entropy-energy square root the frame of the speech signal based on at least one of the square root of the energy and the square root of the spectral entropy; and determining that the frame of the speech signal is an unvoiced frame if the spectral entropy-energy square root of the speech signal is less than a first threshold; or determining that the frame of the speech signal is a voiced frame if the spectral entropy-energy square root of the speech signal is greater than or equal to the first threshold.

An embodiments of this application discloses a computer readable storage medium, storing a computer program, the computer program including program instructions, the program instructions, when executed by a processor, causing the processor to execute the method described above.

BRIEF DESCRIPTION OF THE DRAWINGS

To illustrate the technical solutions in embodiments of this application or in the related technology, the accompanying drawings required for describing the embodiments or the related technology are briefly described below.

DESCRIPTION OF EMBODIMENTS

The technical solutions in the embodiments of this application are described below with reference to the accompanying drawings in the embodiments of this application.

It should be understood that, terminologies used in the specification of this application are merely for describing specific embodiments, but are not intended to limit this application.

It should also be understood that, the terms "and/or" as used in the specification and claims of this application refer to any combination of one or more of associated items listed and all possible combinations, and include such combinations.

In specific implementations, a terminal described in the embodiments of this application includes, but is not limited to, a portable device such as a mobile phone, laptop computer or tablet computer having a touch-sensitive surface (for example, a touch screen display and/or touchpad). It should also be understood that in some embodiments, the terminal is not a portable device, but a desktop computer having a touch-sensitive surface (for example, a touch screen display and/or a touchpad).

The following describes a terminal including a display and a touch-sensitive surface. However, it should be understood that the terminal may include one or more other physical user interface devices such as a physical keyboard, a mouse and/or a joystick.

In some examples, a VAD algorithm is used to compare a feature (for example, short-term energy, spectral entropy and spectral entropy-energy product) of each frame of speech signal obtained through calculation, to determine whether the frame is a voiced frame. However, the setting of a threshold is difficult for the solution based on short-term energy and spectral entropy, because different devices and different recording environments affect the threshold greatly. The solution based on spectral entropy-energy product often fails to effectively reflect characteristics of voiced frames and cannot accurately detect voiced segments.

To resolve the technical problems, the embodiments of this application provide a voice activity detection method, a voice activity detection apparatus, a voice activity detection device and a computer readable storage medium, to resolve the technical problems related to the setting of a threshold in the solution based on short-term energy and spectral entropy is greatly affected by the recording environment or related to the solution based on spectral entropy-energy product fails to effectively reflect characteristics of voiced frames and cannot accurately detect voiced segments.

Figure 1:
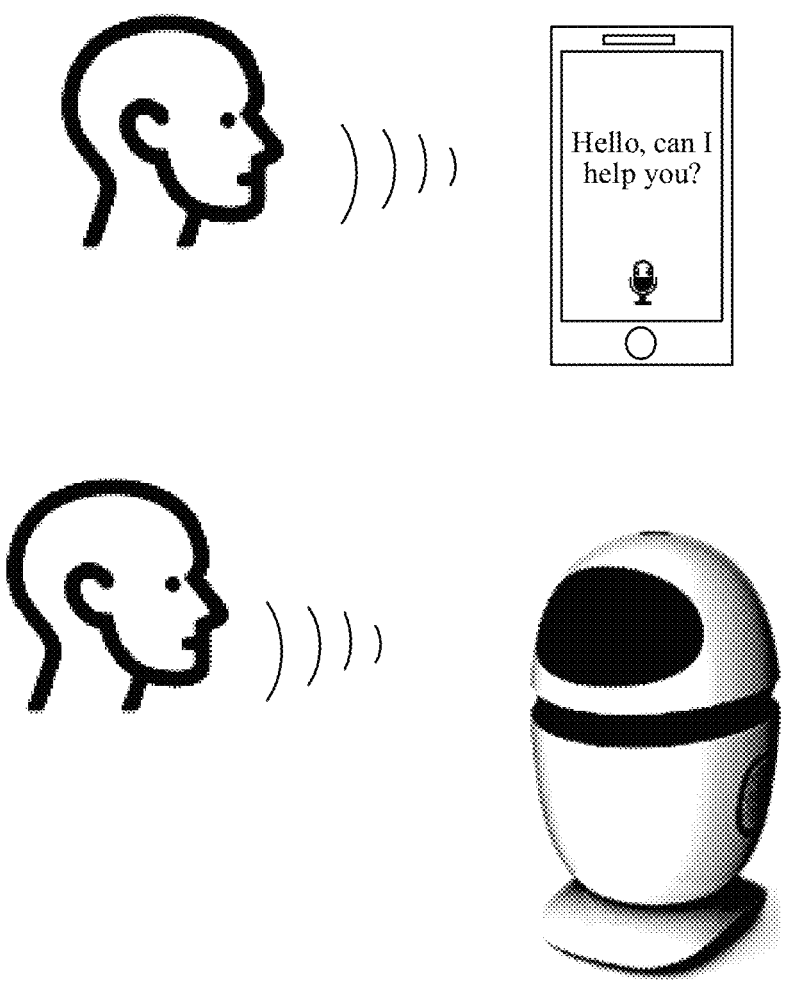
FIG. 1 is a schematic diagram of an environment of a voice activity detection method according to an embodiment of this application.

To better understand the voice activity detection method, the voice activity detection apparatus and the voice activity detection device provided by the embodiments of this application, an environment to which the voice activity detection method is applicable according to the embodiments of this application will be first described below. FIG. 1 is a schematic diagram of an environment of a voice activity detection method according to an embodiment of this application. As shown in FIG. 1, almost all speech recognition systems require voice activity detection. For example, when a user turns on a smart terminal (such as a smartphone) to input voice instructions, the smartphone needs to perform voice activity detection when acquiring speech data or a speech signal. For another example, when the user performs voice interaction with a smart robot at home, the smart robot also needs to perform voice activity detection, so as to detect a speech start frame of a speech signal and perform recognition to obtain and execute a specific operation instruction.

The smart terminal in the embodiments of this application may include, but is not limited to, any type of handheld electronic products based on a smart operating system and configured to perform human-computer interaction with the user through an input device such as a keyboard, an on-screen keyboard, a touchpad, a touch screen or a sound control device, such as a smartphone, tablet computer, personal computer, smart robot or smart voice self-service machine for use in public places such as hospitals and exit-entry administration reception halls. The smart operating system includes, but is not limited to, any operating system providing mobile devices with a plurality of mobile applications to enriching functions of the devices, for example, Android™ iOS™ and Windows Phone™.

The environment of the voice activity detection method provided by this application is not limited to that shown in FIG. 1.

Figure 2:
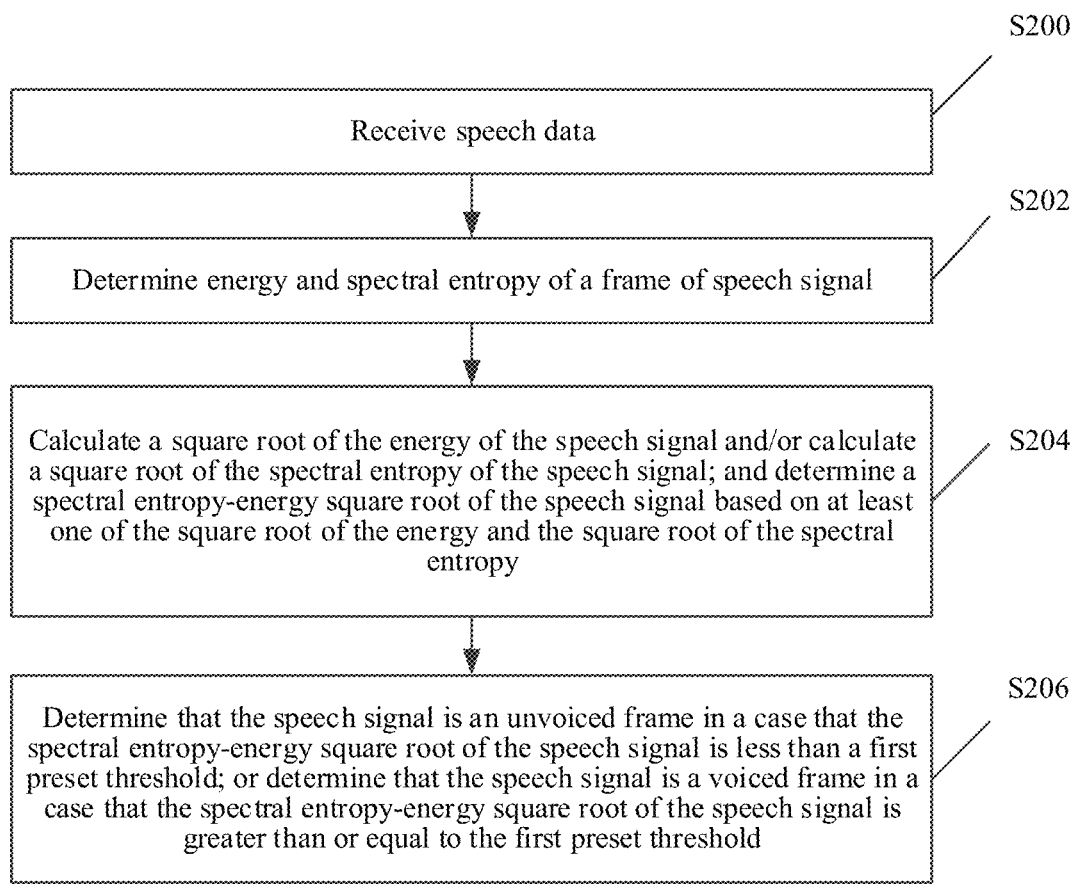
FIG. 2 is a schematic flowchart of a voice activity detection method according to an embodiment of this application.

Based on the environment of the voice activity detection method in FIG. 1, FIG. 2 is a schematic flowchart of a voice activity detection method according to an embodiment of this application. The method may be executed by a smart terminal, and may include the following steps.

Step S200: Receive speech data, the speech data including a multi-frame speech signal.

Specifically, a voice activity detection device (or a speech recognition system) may acquire speech data (that is, a speech signal) through a built-in unit such as a microphone, thus receiving the speech data, and the voice activity detection device may receive the speech data through data communication with a peripheral device. The speech data includes a multi-frame speech signal.

Step S202: Determine energy and spectral entropy of a frame of speech signal.

Specifically, the voice activity detection device may determine the energy and the spectral entropy of each frame of speech signal based on a frame sequence of the received multi-frame speech signal. Short-term energy (that is, energy) of each speech frame (that is, each frame of speech signal) may be determined according to the following formula 1:

$$E(l) = \sum_{n=1}^{M} x^2(n, l) \quad \text{Formula 1}$$

where M represents a frame length, l represents a $l^{th}$ frame of speech, and x(n,l) represents an amplitude of an $n^{th}$ point in the $l^{th}$ frame of speech.

The spectral entropy is to achieve the purpose of speech endpoint detection by detecting flatness of a speech power spectrum. For a speech signal having a wide frequency band, a power spectrum of an unvoiced segment is distributed relatively evenly in frequency bands, indicating that the unvoiced segment has a large average amount of information, that is, a high spectral entropy; a power spectrum of a voiced segment is concentrated on several frequency bands and changes greatly, indicating that the voiced segment has a small average amount of information, that is, a lower spectral entropy. A method of determining the spectral entropy includes two steps.

1) Fast Fourier transformation (FFT). Because characteristics of a signal are difficult to observe through changes of the signal in time domain, the signal is usually converted into an energy distribution in frequency domain for observation, and different energy distributions represent characteristics of different speeches. Therefore, each frame, after being multiplied by a Hamming window, needs to be subjected to fast Fourier transformation to obtain an energy distribution in a frequency spectrum. After the frames of signals are framed and windowed, fast Fourier transformation needs to be performed on the frames of signals to obtain a frequency spectrum of each frame. A modular square of a frequency spectrum of the speech signal is calculated to obtain the power spectrum of the speech signal. Assume that a discrete Fourier transform (DFT) of the speech signal may be as expressed by formula 2:

$$X(k, l) = \sum_{n=1}^{N} x(n, l) \cdot \exp(-j2\pi kn/N), k \leq N \quad \text{Formula 2}$$

In the formula 2, X(k,l) represents a spectral amplitude value of a $k^{th}$ frequency band of an $l^{th}$ frame; and N represents a change length of the FFT (where N is 256 in this technical solution).

2) Determine a probability density. Because the speech signal is more similar to a power signal, an entropy function is constructed by using the speech power spectrum, and considering symmetry of the power spectrum, only half the number of component points before the FFT is selected, thereby reducing the amount of calculation. Total energy of a noisy speech power spectrum of the $l^{th}$ frame of speech signal may be as expressed by formula 3:

$$E_{sum}(l) = \sum_{k=1}^{N/2+1} |X(k, l)|^2 \quad \text{Formula 3}$$

A probability density function corresponding to the $k^{th}$ frequency band of the $l^{th}$ frame may be as expressed by formula 4:

$$P(k,l)=|X(k,l)|^2/E_{sum}(l) \quad \text{Formula 4}$$

Spectral entropy of the $l^{th}$ frame may be as expressed by formula 5:

$$H(l) = -\sum_{k=1}^{N} P(k, l) * \log(p(k.l)) \quad \text{Formula 5}$$

Step S204: Calculate a square root of the energy of the speech signal and/or calculate a square root of the spectral entropy of the speech signal; and determine a spectral entropy-energy square root of the speech signal based on at least one of the square root of the energy and the square root of the spectral entropy.

Specifically, the spectral entropy-energy square root in this embodiment of this application is a new voice feature, that is, the spectral entropy-energy square root is a voice feature of the speech signal. The following three determining methods may be used:

1) Calculate the square root of the energy of the speech signal, and multiply the spectral entropy of the speech signal by the spectral entropy of the speech signal, to determine the spectral entropy-energy square root of the speech signal, as expressed by formula 6:

$$HE(l)=H(l)*\sqrt{E(l)} \quad \text{Formula 6}$$

where H(l) is the spectral entropy of the speech signal, and E(l) is the energy of the speech signal.

2) Calculate the square root of the spectral entropy of the speech signal, and multiply the energy of the speech signal by the spectral entropy of the speech signal, to determine the spectral entropy-energy square root of the speech signal, as expressed by formula 7:

$$HE(l)=\sqrt{H(l)}*E(l) \quad \text{Formula 7}$$

3) Calculate the square root of the energy of the speech signal and calculate the square root of the spectral entropy of the speech signal, and multiply the square root of the energy by the square root of the spectral entropy, to determine the spectral entropy-energy square root of the speech signal, as expressed by formula 8:

$$HE(l)=\sqrt{H(l)*E(l)} \quad \text{Formula 8}$$

Step S206: Determine that the speech signal is an unvoiced frame if the spectral entropy-energy square root of the speech signal is less than a first preset threshold; or determine that the speech signal is a voiced frame if the spectral entropy-energy square root of the speech signal is greater than or equal to the first preset threshold.

Specifically, the first preset threshold in this embodiment of this application may be a threshold set by research and development personnel based on experimental data, or may be a threshold set based on a pre-analysis of the current speech data by the voice activity detection device.

According to this embodiment of this application, after speech data is received and energy and spectral entropy of a frame of speech signal are determined, a square root of the energy of the speech signal is calculated and/or a square root of the spectral entropy of the speech signal is calculated; and a spectral entropy-energy square root of the speech signal is determined based on at least one of the square root of the energy and the square root of the spectral entropy; and whether the speech signal is a voiced frame is determined based on the spectral entropy-energy square root. Because the spectral entropy-energy square root can combine the time domain and frequency domain characteristics more closely, this application resolves the problem that in the related technology, the solution based on short-term energy and spectral entropy has low endpoint detection accuracy during speech recognition because the setting of a threshold greatly affected by the recording environment and a single feature is easily affected by noise, and also resolves the technical problem that the solution based on spectral entropy-energy product in which time domain and frequency domain characteristics are not combined closely fails to effectively reflect characteristics of voiced frames and cannot accurately detect voiced segments, thereby greatly improving accuracy of speech detection.

Figure 3:
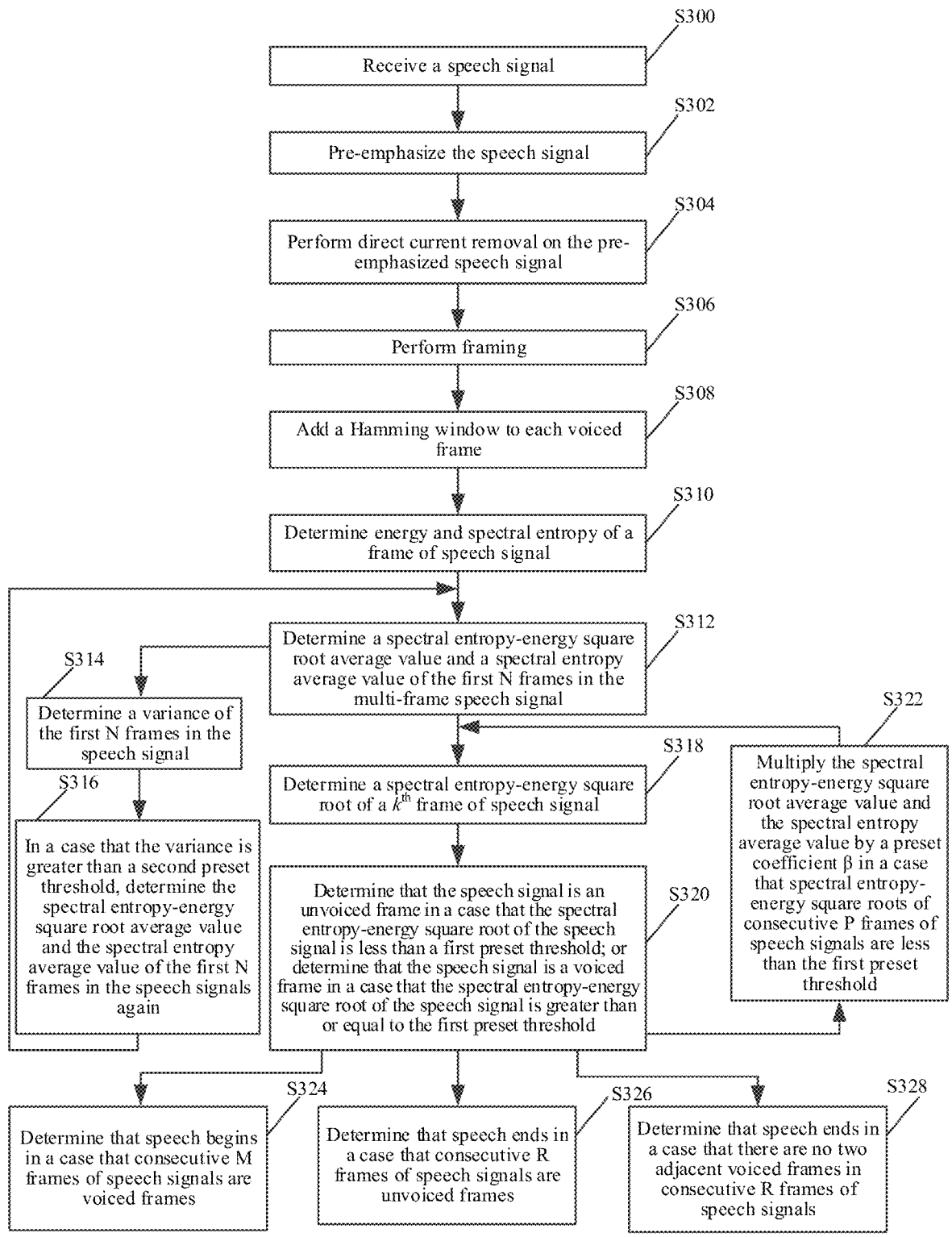
FIG. 3 is a schematic flowchart of a voice activity detection method according to another embodiment of this application.

FIG. 3 is a schematic flowchart of a voice activity detection method according to another embodiment of this application, which may include the following steps:

Step S300: Receive a speech signal.

Specifically, this step is the same as step S200 in the embodiment in FIG. 2, so the details are not described herein again.

Step S302: Pre-emphasize the speech signal.

Specifically, a sampled digital speech signal s(n) is passed through a high pass filter, as expressed by the following formula 9:

$$H(z)=1-a*z^{-1}, 0.9<a<1.0. \quad \text{Formula 9}$$

In the formula, a may be 0.95, 0.96 and the like. The pre-emphasized signal may be as expressed by formula 10:

$$s(n)=s(n)-a\times s(n-1). \quad \text{Formula 10}$$

The pre-emphasis is for the purpose of boosting high-frequency components to flatten the frequency spectrum of the signal, so that the frequency spectrum can be calculated by using the same signal-to-noise ratio in the entire frequency spectrum from low frequency to high frequency, and is also for the purpose of eliminating the effect of vocal cords and lips during speech, and compensating for the high-frequency components of the speech signal that are suppressed by the vocal system, and highlighting high-frequency formants.

Step S304: Perform direct current removal on the pre-emphasized speech signal.

Specifically, the direct current component is a slow-varying component in frequency domain, and is generally caused by an instrument in the signal acquisition process. If a frequency spectrum analysis is needed, spectral leakage of the direct current component greatly affects the low-frequency spectrum analysis. The direct current component generally does not change with time, and does not reflect the tendency of the signal. A direct current removal formula may be as expressed by the following formula 11:

$$V[n]=S[n]-S[n-1]+\eta*V[n-1] \quad \text{Formula 11}$$

where S[n] represents an original speech signal, V[n] represents a speech signal obtained after the direct current removal, and 11 may be 0.9997.

Step S306: Perform voice framing.

Specifically, the speech signal obtained after the direct current removal is framed into a plurality of speech frames. To facilitate the speech analysis, the speech may be divided into small segments which are referred to as frames. First, a number C of acquisition points constitute one observation unit referred to as a frame. Generally, C has a value of 256 or 512, covering a time of about 10 to 30 ms. To avoid too significant changes between adjacent two frames, there is an overlap area between two adjacent frames. The overlap area contains Q sampling points. The value of Q in this embodiment of this application may be ½ or ⅓ of C. For example, if C is 256, Q may be 128. Generally, a speech signal sampling frequency used in speech recognition is 8 KHz or 16 KHz. In the case of 16 KHz, if a frame length is 256 acquisition points, a corresponding time length is 256/16000×1000=16 ms.

Step S308: Add a Hamming window to each speech frame.

The speech constantly changes in a long range and has no fixed characteristics, and therefore is difficult to process. Therefore, each frame is substituted into a window function, and values outside the window are set to 0, to eliminate signal discontinuity that may occur at two ends of each frame. Square window, Hamming window, Hanning window and the like are commonly used window functions. Considering frequency domain characteristics of the window function, the Hamming window is usually used. Each frame is multiplied by a Hamming window, to increase continuity at the left end and right end of the frame. It is assumed that the signal after the framing is S(n), n=0, 1, ..., N−1, N being the size of the frame. In this case, after the signal is multiplied by the Hamming window, the following formula 12 applies:

$$S'(n)=S(n)\times W(n) \quad \text{Formula 12}$$

A form of the W (n) may be as expressed by the following formula 13:

$$W(n, a) = (1-a) - a\times\cos\left[\frac{2\pi n}{N-1}\right], 0 \leq n \leq N-1 \quad \text{Formula 13}$$

Different values of a may lead to the generation of different Hamming windows, and in this embodiment of this application, a may be 0.46.

Step S310: Determine energy and spectral entropy of a frame of speech signal.

Specifically, this step is the same as step S202 in the embodiment in FIG. 2, so the details are not described herein again.

Step S312: Determine a spectral entropy-energy square root average value HE(0) and a spectral entropy average value H(0) of the first N frames in the multi-frame speech signal.

Specifically, speech generally begins with a period of silence or ambient noise. In this embodiment of this application, it is assumed that the first N frames of the speech is background noise (for example, N may be 15), and the spectral entropy-energy square root average value HE(0) of the first N frames is determined as a decision threshold. A formula for determining HE(0) may be as expressed by formula 14:

$$HE(0) = \frac{1}{N}\sum_{l=1}^{N} HE(l)', \, HE(l)' = \sqrt{H(l)*E(l)} \quad \text{Formula 14}$$

where H(l) is spectral entropy of an $l^{th}$ frame of speech signal, E(l) is short-term energy of the spectral entropy of the $l^{th}$ frame of speech signal; and in this embodiment of this application, the first preset threshold may include αHE(0), a value range of α including [1,2].

In an embodiment, in step S312, when the spectral entropy-energy square root average value HE(0) of the first N frames is determined, the spectral entropy average value H(0) of the first N frames may also be determined. A formula for determining H(0) may be as expressed by formula 15:

$$H(0) = \frac{1}{N}\sum_{l=1}^{N} H(l) \quad \text{Formula 15}$$

In this embodiment of this application, in the process of determining whether speech begins, the determined spectral entropy and spectral entropy-energy square root of the current frame are divided by the current frame number, and the results are respectively added to H(0) and HE(0) to increases the thresholds, to prevent an occasional fluctuation in the speech from affecting the decision, that is, to avoid incorrectly determining that the speech begins. In this way, the detection accuracy is further improved.

Step S314: Determine a variance of the first N frames in the speech signal.

Specifically, after the spectral entropy average value H(0) of the first N frames is determined, the concept of variance may further be introduced into this embodiment of this application, that is, the variance of the first N frames is determined, specifically as expressed by the following formula 16:

$$SQ(0) = \frac{1}{N}(H(l) - H(0))^2 \quad \text{Formula 16}$$

Step S316: If the variance is greater than a second preset threshold, perform the operation of determining the spectral entropy-energy square root average value HE(0) and the spectral entropy average value H(0) of the first N frames in the speech signals again.

Specifically, a value range of the second preset threshold in this embodiment of this application may include [0.2, 0.5]. For example, the second preset threshold is 0.3. In this case, when the variance SQ(0) is greater than 0.3, it is considered that there is non-stationary noise in the speech, and, the determined H(0) and HE(0) are no longer useful, and the spectral entropy-energy square root average value HE(0) and the spectral entropy average value H(0) of the first N frames need to be determined again, thereby improving the robustness of the determining method against non-stationary noise.

Step S318: According to a formula HE(k)=$\sqrt{|H(k)-H(0)|*E(k)}$, determine a spectral entropy-energy square root HE(k) of a $k^{th}$ frame of speech signal.

Specifically, $$H(0) = \frac{1}{N}\sum_{l=1}^{N} H(l),$$

and k is greater than N. Energy and spectral entropy of subsequent speech frames following the first N frames are substituted into the formula HE(k)=$\sqrt{|H(k)-H(0)|*E(k)}$, to obtain spectral entropy-energy square roots of the subsequent speech frames.

Step S320: Determine that the speech signal is an unvoiced frame if the spectral entropy-energy square root of the speech signal is less than a first preset threshold; or determine that the speech signal is a voiced frame if the spectral entropy-energy square root of the speech signal is greater than or equal to the first preset threshold.

Specifically, this step is the same as step S206 in the embodiment in FIG. 2, so the details are not described herein again.

Step S322: Multiply the spectral entropy-energy square root average value HE(0) and H(0) by a preset coefficient β if spectral entropy-energy square roots of consecutive P frames of speech signals are less than the first preset threshold.

Specifically, a value range of P in this embodiment of this application may include [30, 60]. The consecutive P frames are determined, and the preset coefficient β may be greater than 0 and less than 1, for example, the preset coefficient β is 0.4. In this embodiment of this application, the spectral entropy-energy square root average value HE(0) and H(0) are multiplied by the preset coefficient β to obtain a new spectral entropy-energy square root average value HE(0) and H(0), thus introducing an adaptive threshold mechanism into the decision process, to adaptively adjust the first preset threshold in this embodiment of this application, thereby alleviating the problem of inaccurate detection of a silence segment and an endpoint start detection segment.

Step S324: Determine that speech begins if consecutive M frames of speech signals are voiced frames.

Specifically, a value range of M in this embodiment of this application may include [5, 15], for example, may be 6. The first frame of speech signal in the M frames of speech signals is the first voiced frame.

Step S326: Determine that speech ends if consecutive R frames of speech signals are unvoiced frames.

Specifically, a value range of R in this embodiment of this application may include [40, 80], for example, may be 50.

Step S328: Determine that speech ends if there are no two adjacent voiced frames in the consecutive R frames of speech signals.

Specifically, in a process of detecting whether the speech ends, the method may further include: determining that the speech ends if there are no two adjacent voiced frames (that is, two consecutive voiced frames) in the consecutive R frames of speech signals; or determining that the speech does not end if there are two consecutive voiced frames (that is, two adjacent voiced frames) in the consecutive R frames of speech signals, and detecting again whether the speech ends, for example, by determining again whether there are no two adjacent voiced frames in consecutive R frames of speech signals. For example, only one of the consecutive R frames of speech signals is a voiced frame, but a frame which is not a voiced frame is incorrectly determined (to be a voiced frame); in this case, it is incorrectly determined that the speech does not end. Therefore, through step S328, it is ensured that a correct decision is made on whether the speech ends, thereby enhancing the robustness of decision making.

In an embodiment of this application, after step S310 of determining the energy and the spectral entropy of the frame of speech signal in, the method may further include: discarding the speech signal if the energy of the speech signal is greater than a third preset threshold; or, discarding the speech signal if the energy of the speech signal is less than a fourth preset threshold.

Specifically, the third preset threshold in this embodiment of this application may be $1.15\times10^{10}$, and the fourth preset threshold may be 1000. By determining whether the energy of the speech signal is greater than the third preset threshold or less than the fourth preset threshold, some noise caused by hardware may be discarded, making the voice detection more accurate.

According to this embodiment of this application, after speech data is received and energy and spectral entropy of a frame of speech signal are determined, a square root of the energy of the speech signal is calculated and/or a square root of the spectral entropy of the speech signal is calculated; and a spectral entropy-energy square root of the speech signal is determined based on at least one of the square root of the energy and the square root of the spectral entropy; and whether the speech signal is a voiced frame is determined based on the spectral entropy-energy square root. Because the spectral entropy-energy square root can combine the time domain and frequency domain characteristics more closely, this application resolves the problem that in the related technology, the solution based on short-term energy and spectral entropy has low endpoint detection accuracy because the setting of a threshold greatly affected by the recording environment and a single feature is easily affected by noise, and also resolves the technical problem that the solution based on spectral entropy-energy product in which time domain and frequency domain characteristics are not combined closely fails to effectively reflect characteristics of voiced frames and cannot accurately detect voiced segments, thereby greatly improving accuracy of speech detection.

Figure 4:
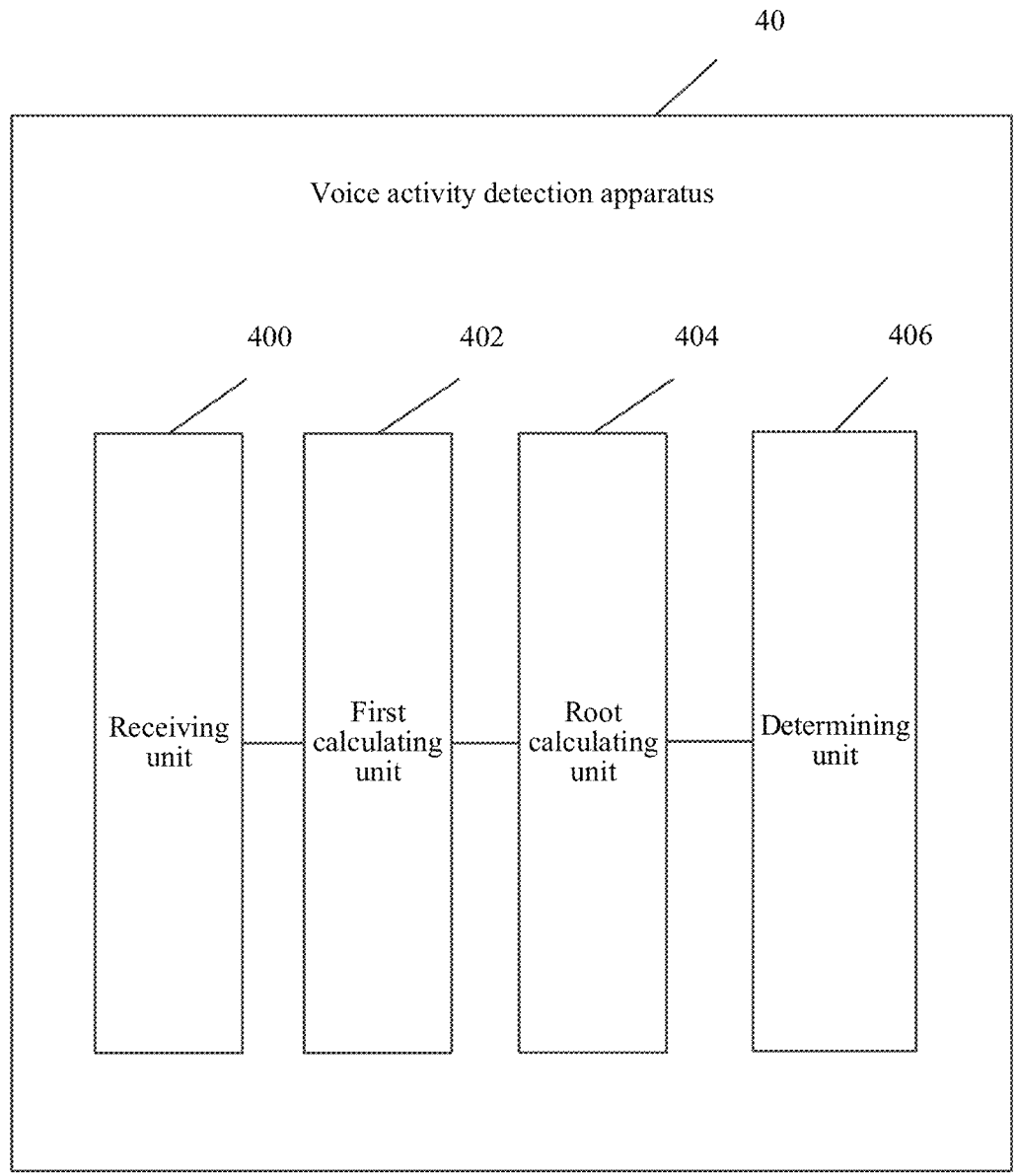
FIG. 4 is a schematic structural diagram of a voice activity detection apparatus according to an embodiment of this application.

To better implement the solutions of the embodiments of this application, the application further correspondingly provides a voice activity detection apparatus, which is described in detail below with reference to the accompanying drawings:

FIG. 4 is a schematic structural diagram of a voice activity detection apparatus according to an embodiment of this application. The voice activity detection apparatus 40 may include a receiving unit 400, a first calculating unit 402, a square root unit 404 and a determining unit 406.

The receiving unit 400 is configured to receive speech data, the speech data including a multi-frame speech signal.

The first calculating unit 402 is configured to determine energy and spectral entropy of a frame of speech signal.

The square root unit 404 is configured to calculate a square root of the energy of the speech signal and/or calculate a square root of the spectral entropy of the speech signal; and determine a spectral entropy-energy square root of the speech signal based on at least one of the square root of the energy and the square root of the spectral entropy.

The determining unit 406 is configured to determine that the speech signal is an unvoiced frame if the spectral entropy-energy square root of the speech signal is less than a first preset threshold; or determine that the speech signal is a voiced frame if the spectral entropy-energy square root of the speech signal is greater than or equal to the first preset threshold.

Specifically, that the square root unit 404 determines the spectral entropy-energy square root of the speech signal based on at least one of the square root of the energy and the square root of the spectral entropy may include: after calculating the square root of the energy of the speech signal, multiplying the square root of the energy by the spectral entropy of the speech signal, to obtain the spectral entropy-energy square root of the speech signal, or after calculating the square root of the spectral entropy of the speech signal, multiplying the square root of the spectral entropy by the energy of the speech signal, to obtain the spectral entropy-energy square root of the speech signal, or after calculating the square root of the energy of the speech signal and calculating the square root of the spectral entropy of the speech signal, multiplying the square root of the energy by the square root of the spectral entropy, to obtain the spectral entropy-energy square root of the speech signal.

Figure 5:
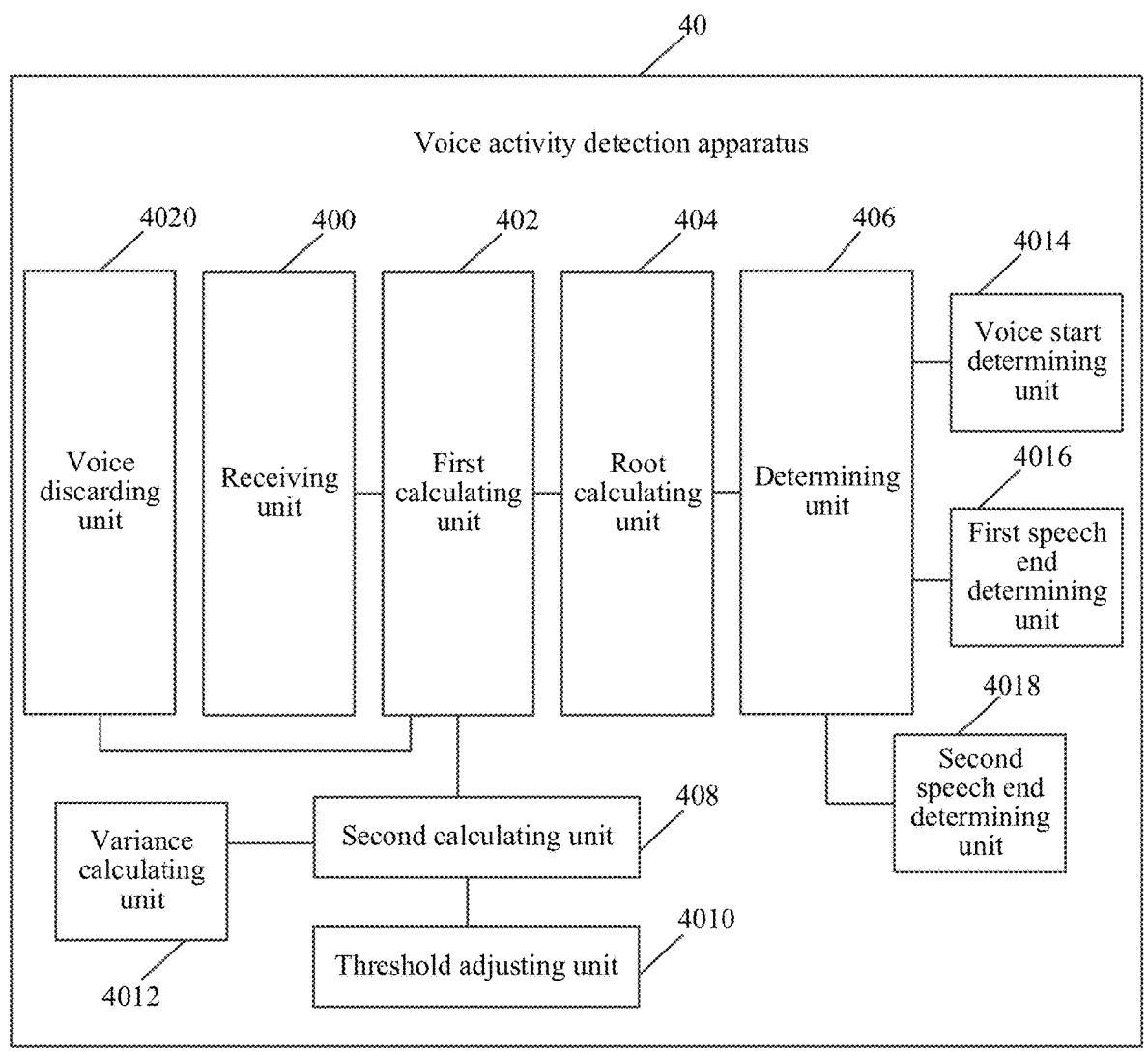
FIG. 5 is a schematic structural diagram of a voice activity detection apparatus according to another embodiment of this application.

FIG. 5 is a schematic structural diagram of a voice activity detection apparatus according to another embodiment of this application shown. The voice activity detection apparatus 40 includes the receiving unit 400, the first calculating unit 402, the square root unit 404 and the determining unit 406, and may further include: a second calculating unit 408, a threshold adjusting unit 4010, a variance calculating unit 4012, a speech start determining unit 4014, a first speech end determining unit 4016, a second speech end determining unit 4018 and a voice discarding unit 4020.

The second calculating unit 408 is configured to, after the first calculating unit 402 determines the energy and the spectral entropy of the frame of speech signal and before the square root unit 404 calculates the square root of the energy of the speech signal and/or calculates the square root of the spectral entropy of the speech signal, determine a spectral entropy-energy square root average value HE(0) of the first N frames in the multi-frame speech signal, where $$HE(0) = \frac{1}{N}\sum_{l=1}^{N} HE(l)', HE(l)' = \sqrt{H(l)*E(l)},$$

H(l) being spectral entropy of an $l^{th}$ frame of speech signal, and E(l) being short-term energy of the spectral entropy of the $l^{th}$ frame of speech signal; and the first preset threshold includes αHE(0), a value range of α including [1,2].

The square root unit 404 may be specifically configured to determine a spectral entropy-energy square root HE(k) of a $k^{th}$ frame of speech signal according to a formula $$HE(k) = \sqrt{|H(k) - H(0)|*E(k)}, H(0) = \frac{1}{N}\sum_{l=1}^{N} H(l),$$

H(k) being spectral entropy of the $k^{th}$ frame of speech signal, and E(k) being short-term energy of the spectral entropy of the $k^{th}$ frame of speech signal, k being greater than N.

The threshold adjusting unit 4010 is configured to, after the square root unit 404 determines the spectral entropy-energy square root of the speech signal and before the determining unit 406 determines that the speech signal is a voiced frame, multiply the spectral entropy-energy square root average value HE(0) and H(0) by a preset coefficient β if spectral entropy-energy square roots of consecutive P frames of speech signals are less than the first preset threshold, the preset coefficient β being greater than 0 and less than 1.

The variance calculating unit 4012 is configured to, after the second calculating unit 408 determines the spectral entropy-energy square root average value HE(0) of the first N frames in the speech signal, determine a variance of the first N frames in the speech signal; and if the variance is greater than a second preset threshold, perform the operation of determining a spectral entropy-energy square root average value HE(0) of the first N frames in the multi-frame speech signal again.

The speech start determining unit 4014 is configured to, after the determining unit 406 determines that the speech signal is a voiced frame, determine that speech begins if consecutive M frames of speech signals are voiced frames, the first frame of speech signal in the M frames of speech signals being the first voiced frame.

The first speech end determining unit 4016 is configured to, after the determining unit 406 determines that the speech signal is an unvoiced frame, determine that speech ends if consecutive R frames of speech signals are unvoiced frames.

The second speech end determining unit 4018 is configured to, after the determining unit 406 determines that the speech signal is an unvoiced frame, determine that speech ends if there are no two adjacent voiced frames in the consecutive R frames of speech signals.

The voice discarding unit 4020 is configured to, after the first calculating unit 402 determines the energy and the spectral entropy of the frame of speech signal, discard the speech signal if the energy of the speech signal is greater than a third preset threshold; or discard the speech signal if the energy of the speech signal is less than a fourth preset threshold.

The voice activity detection apparatus 40 in this embodiment of this application is the voice activity detection device in the embodiments of FIG. 2 to FIG. 3. For functions of the modules in the voice activity detection apparatus 40, reference can be correspondingly made to the specific implementations of the embodiments of FIG. 2 to FIG. 3 in the method embodiments, and the details are not described herein again.

Figure 6:
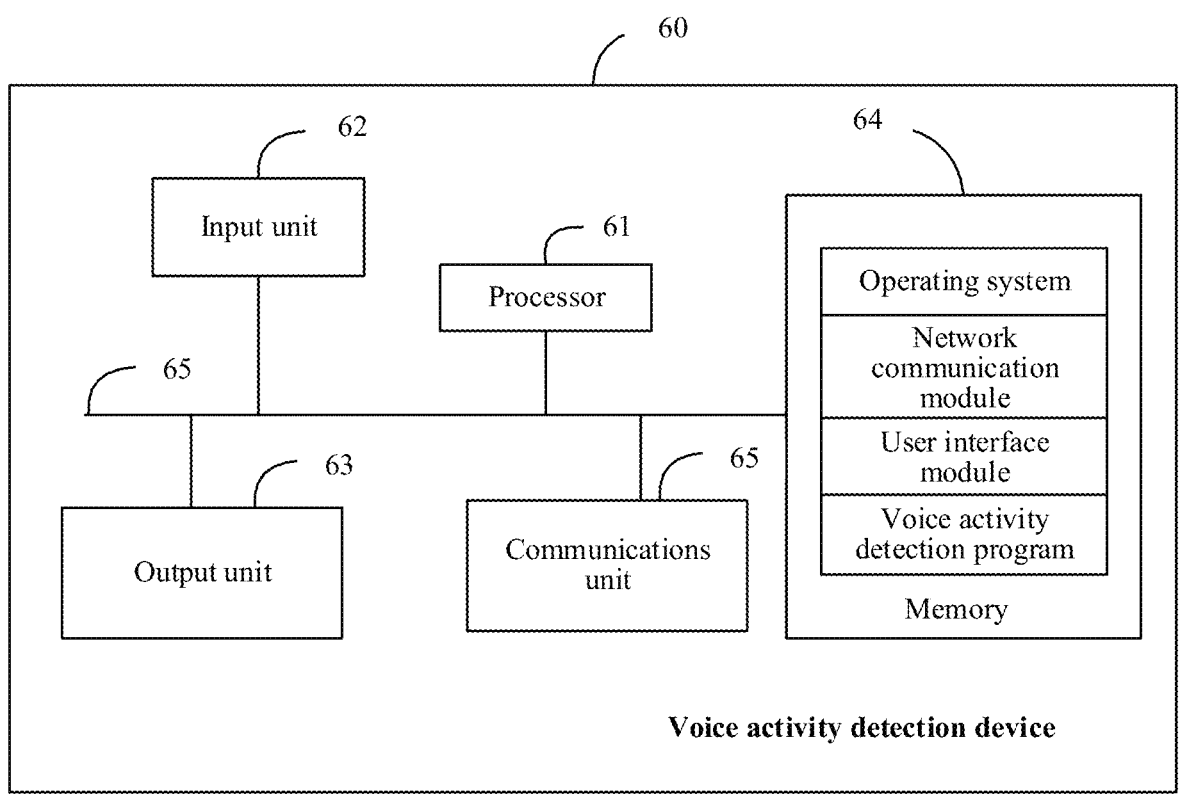
FIG. 6 is a schematic structural diagram of a voice activity detection device according to an embodiment of this application.

To better implement the solutions of the embodiments of this application, this application further correspondingly provides a voice activity detection device. FIG. 6 is a schematic structural diagram of a voice activity detection device according to an embodiment of this application. The voice activity detection device 60 may include a processor 61, an input unit 62, an output unit 63, a memory 64 and a communications unit 65. The processor 61, the input unit 62, the output unit 63, the memory 64 and the communications unit 65 may be connected to each other through a bus 66. The memory 64 may be a high-speed random access memory (RAM), or may be a non-volatile memory, for example, at least one magnetic disk storage. The memory 64 includes a flash in the embodiments of this application. The memory 64 may alternatively be at least one memory system remote from the processor 61. The memory 64 is configured to store application code that may include an operating system, a network communication module, a user interface module and a voice activity detection program.

The communications unit 65 is configured to exchange information with an external unit. The processor 61 is configured to call the application code to execute the following operations: receiving speech data through the communications unit 65, the speech data including a multi-frame speech signal, where the voice activity detection device 60 may further include a voice acquisition module, and receive the speech data through the voice acquisition module; determining energy and spectral entropy of a frame of speech signal; calculating a square root of the energy of the speech signal and/or calculating a square root of the spectral entropy of the speech signal; and determining a spectral entropy-energy square root of the speech signal based on at least one of the square root of the energy and the square root of the spectral entropy; and determining that the speech signal is an unvoiced frame if the spectral entropy-energy square root of the speech signal is less than a first preset threshold; or determining that the speech signal is a voiced frame if the spectral entropy-energy square root of the speech signal is greater than or equal to the first preset threshold.

Specifically, that the processor 61 determines the spectral entropy-energy square root of the speech signal based on at least one of the square root of the energy and the square root of the spectral entropy may include: after calculating the square root of the energy of the speech signal, multiplying the square root of the energy by the spectral entropy of the speech signal, to obtain the spectral entropy-energy square root of the speech signal.

Specifically, that the processor 61 determines the spectral entropy-energy square root of the speech signal based on at least one of the square root of the energy and the square root of the spectral entropy may include: after calculating the square root of the spectral entropy of the speech signal, multiplying the square root of the spectral entropy by the energy of the speech signal, to obtain the spectral entropy-energy square root of the speech signal.

Specifically, that the processor 61 determines the spectral entropy-energy square root of the speech signal based on at least one of the square root of the energy and the square root of the spectral entropy may include: after calculating the square root of the energy of the speech signal and calculating the square root of the spectral entropy of the speech signal, multiplying the square root of the energy by the square root of the spectral entropy, to obtain the spectral entropy-energy square root of the speech signal.

Specifically, after determining the energy and the spectral entropy of the frame of speech signal and before calculating the square root of the energy of the speech signal and/or calculating the square root of the spectral entropy of the speech signal, the processor 61 may further execute: determining a spectral entropy-energy square root average value HE(0) of the first N frames in the multi-frame speech signal, where $$HE(0) = \frac{1}{N}\sum_{l=1}^{N} HE(l)', \quad HE(l)' = \sqrt{H(l) * E(l)},$$

H(l) being spectral entropy of an $l^{th}$ frame of speech signal, and E(l) being short-term energy of the spectral entropy of the $l^{th}$ frame of speech signal; and the first preset threshold includes αHE(0), a value range of α including [1,2].

Specifically, that the processor 61 determines the spectral entropy-energy square root of the speech signal based on at least one of the square root of the energy and the square root of the spectral entropy may include:

according to a formula $HE(k) = \sqrt{|H(k)-H(0)|*E(k)}$, determining a spectral entropy-energy square root HE(k) of a $k^{th}$ frame of speech signal, $$H(0) = \frac{1}{N}\sum_{l=1}^{N} H(l),$$

H(k) being spectral entropy of the $k^{th}$ frame of speech signal, and E(k) being short-term energy of the spectral entropy of the $k^{th}$ frame of speech signal, k being greater than N.

Specifically, after determining the spectral entropy-energy square root of the speech signal and before determining that the speech signal is a voiced frame, the processor 61 may further execute: multiplying the spectral entropy-energy square root average value HE(0) and H(0) by a preset coefficient β if spectral entropy-energy square roots of consecutive P frames of speech signals are less than the first preset threshold, the preset coefficient β being greater than 0 and less than 1.

Specifically, after determining the spectral entropy-energy square root average value HE(0) of the first N frames in the multi-frame speech signal, the processor 61 may further execute: determining a variance of the first N frames in the speech signal; and if the variance is greater than a second preset threshold, performing the operation of determining a spectral entropy-energy square root average value HE(0) of the first N frames in the multi-frame speech signal again.

Specifically, after determining that the speech signal is a voiced frame if the spectral entropy-energy square root of the speech signal is greater than or equal to the first preset threshold, the processor 61 may further execute: determining that speech begins if consecutive M frames of speech signals are voiced frames, the first frame of speech signal in the M frames of speech signals being the first voiced frame.

Specifically, after determining that the speech signal is an unvoiced frame if the spectral entropy-energy square root of the speech signal is less than the first preset threshold, the processor 61 may further execute: determining that speech ends if consecutive R frames of speech signals are unvoiced frames.

Specifically, after determining that the speech signal is an unvoiced frame if the spectral entropy-energy square root of the speech signal is less than the first preset threshold, the processor 61 may further execute: determining that speech ends if there are no two adjacent voiced frames in the consecutive R frames of speech signals.

Specifically, after determining the energy and the spectral entropy of the frame of speech signal, the processor 61 may further execute: discarding the speech signal if the energy of the speech signal is greater than a third preset threshold; or discarding the speech signal if the energy of the speech signal is less than a fourth preset threshold.

Figure 7:
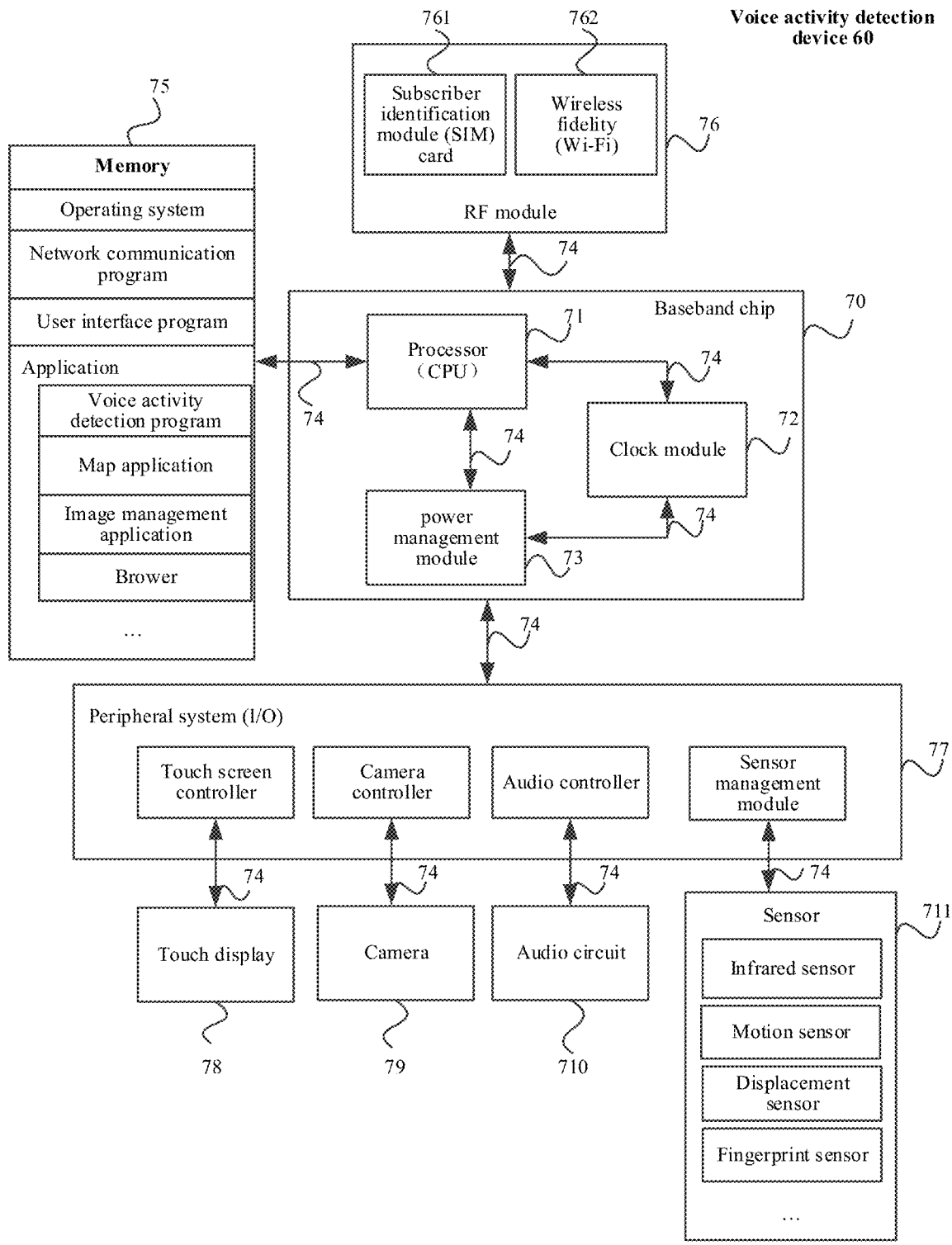
FIG. 7 is a schematic structural diagram of a voice activity detection device according to another embodiment of this application.

In another embodiment, the voice activity detection device provided by this embodiment of this application may be have the structure shown in FIG. 7. The voice activity detection device 60 may be a smart terminal (such as a smartphone or tablet). The voice activity detection device 60 may include a baseband chip 70, a memory 75 (one or more computer readable storage media), a radio frequency (RF) module 76 and a peripheral system 77. The components may communicate with each other over one or more communication buses 74.

The peripheral system 77 is mainly configured to implement an interaction function between the voice activity detection device 60 and a user/external environment, and mainly includes an input/output apparatus of the voice activity detection device 60. In specific implementations, the peripheral system 77 may include: a touch screen controller, a camera controller, an audio controller, and a sensor management module. Each controller may be coupled to a corresponding peripheral device (for example, a touch display 78, a camera 79, an audio circuit 710, and a sensor 711). The peripheral system 77 may further include other I/O peripherals.

The baseband chip 70 may integrate one or more processors 71, a clock module 72, and a power management module 73. The clock module 72 integrated in the baseband chip 70 is mainly configured to generate a clock required for data transmission and timing control for the processor 71. The power management module 73 integrated in the baseband chip 70 is mainly configured to provide a stable high-accuracy voltage to the processor 71, the RF module 76, and the peripheral system.

The RF module 76 is configured to receive and transmit RF signals, includes a subscriber identification module (SIM) card 761 and a wireless fidelity (Wi-Fi) 762, and mainly integrates a receiver and a transmitter of a terminal 7. The RF module 76 communicates with a communications network and other communications devices through RF signals. In specific implementations, the RF module 76 includes, but is not limited to: an antenna system, an RF transceiver, one or more amplifiers, tuners, one or more oscillators, digital signal processors, codec chips, SIM cards, storage media and the like. In some embodiments, the RF module 76 may be implemented on a single chip.

The memory 75 is coupled with the processor 71 and is configured to store various software programs and/or a plurality of sets of instructions. In specific implementations, the memory 75 may include a high-speed random access memory and may also include a non-volatile memory, for example, one or more magnetic disk storage devices, flash devices, or other non-volatile solid state storage devices. The memory 75 may store an operating system. The memory 75 may further store a network communication program, which may be configured to communicate with one or more auxiliary devices, one or more terminal devices, or one or more network devices. The memory 75 may further store a user interface program, which provides a graphical operation interface to vividly display contents of an application and receives a user's control operation on the application through input controls such as a menu, a dialog box and keys.

The memory 75 may further store one or more applications. As shown in FIG. 7, the applications may include: a voice activity detection program, an image management application (for example, album), a map application (for example, Google Earth), and a browser (for example, Safari™ and Google Chrome™).

In this application, the processor 71 may be configured to read and execute computer readable instructions. Specifically, the processor 71 may be configured to call the application stored in the memory 75, for example, the voice activity detection program provided by this application, and execute the instructions included in the application to perform the following operations: receiving speech data through the RF module 76 or the peripheral device (for example, a sensor), the speech data including a multi-frame speech signal; determining energy and spectral entropy of a frame of speech signal; calculating a square root of the energy of the speech signal and/or calculating a square root of the spectral entropy of the speech signal; and determining a spectral entropy-energy square root of the speech signal based on at least one of the square root of the energy and the square root of the spectral entropy; and determining that the speech signal is an unvoiced frame if the spectral entropy-energy square root of the speech signal is less than a first preset threshold; or determining that the speech signal is a voiced frame if the spectral entropy-energy square root of the speech signal is greater than or equal to the first preset threshold.

Specifically, that the processor 71 determines the spectral entropy-energy square root of the speech signal based on at least one of the square root of the energy and the square root of the spectral entropy may include: after calculating the square root of the energy of the speech signal, multiplying the square root of the energy by the spectral entropy of the speech signal, to obtain the spectral entropy-energy square root of the speech signal.

Specifically, that the processor 71 determines the spectral entropy-energy square root of the speech signal based on at least one of the square root of the energy and the square root of the spectral entropy may include: after calculating the square root of the spectral entropy of the speech signal, multiplying the square root of the spectral entropy by the energy of the speech signal, to obtain the spectral entropy-energy square root of the speech signal.

Specifically, that the processor 71 determines the spectral entropy-energy square root of the speech signal based on at least one of the square root of the energy and the square root of the spectral entropy may include: after calculating the square root of the energy of the speech signal and calculating the square root of the spectral entropy of the speech signal, multiplying the square root of the energy by the square root of the spectral entropy, to obtain the spectral entropy-energy square root of the speech signal.

Specifically, after determining the energy and the spectral entropy of the frame of speech signal and before calculating the square root of the energy of the speech signal and/or calculating the square root of the spectral entropy of the speech signal, the processor 71 may further execute: determining a spectral entropy-energy square root average value HE(0) of the first N frames in the multi-frame speech signal, where $$HE(0) = \frac{1}{N}\sum_{l=1}^{N} HE(l)', \quad HE(l)' = \sqrt{H(l) * E(l)},$$

H(l) being spectral entropy of an $l^{th}$ frame of speech signal, and E(l) being short-term energy of the spectral entropy of the $l^{th}$ frame of speech signal; and the first preset threshold includes αHE(0), and a value range of α including [1,2].

Specifically, that the processor 71 determines the spectral entropy-energy square root of the speech signal based on at least one of the square root of the energy and the square root of the spectral entropy may include:

according to a formula HE(k)=√|H(k)−H(0)|*E(k), determining a spectral entropy-energy square root HE(k) of a $k^{th}$ frame of speech signal, $$H(0) = \frac{1}{N}\sum_{l=1}^{N} H(l),$$

H(k) being spectral entropy of the $k^{th}$ frame of speech signal, and E(k) being short-term energy of the spectral entropy of the $k^{th}$ frame of speech signal, k being greater than N.

Specifically, after determining the spectral entropy-energy square root of the speech signal and before determining that the speech signal is a voiced frame, the processor 71 may further execute: multiplying the spectral entropy-energy square root average value HE(0) and H(0) by a preset coefficient β if spectral entropy-energy square roots of consecutive P frames of speech signals are less than the first preset threshold, the preset coefficient β being greater than 0 and less than 1.

Specifically, after determining the spectral entropy-energy square root average value HE(0) of the first N frames in the multi-frame speech signal, the processor 71 may further execute: determining a variance of the first N frames in the speech signal; and if the variance is greater than a second preset threshold, performing the operation of determining a spectral entropy-energy square root average value HE(0) of the first N frames in the multi-frame speech signal again.

Specifically, after determining that the speech signal is a voiced frame if the spectral entropy-energy square root of the speech signal is greater than or equal to the first preset threshold, the processor 71 may further execute: determining that speech begins if consecutive M frames of speech signals are voiced frames, the first frame of speech signal in the M frames of speech signals being the first voiced frame.

Specifically, after determining that the speech signal is an unvoiced frame if the spectral entropy-energy square root of the speech signal is less than the first preset threshold, the processor 71 may further execute: determining that speech ends if consecutive R frames of speech signals are unvoiced frames.

Specifically, after determining that the speech signal is an unvoiced frame if the spectral entropy-energy square root of the speech signal is less than the first preset threshold, the processor 71 may further execute: determining that speech ends if there are no two adjacent voiced frames in the consecutive R frames of speech signals.

Specifically, after determining the energy and the spectral entropy of the frame of speech signal, the processor 71 may further execute: discarding the speech signal if the energy of the speech signal is greater than a third preset threshold; or discarding the speech signal if the energy of the speech signal is less than a fourth preset threshold.

The voice activity detection apparatus 40 or the voice activity detection device 60 in this embodiment of this application corresponds to the methods in the embodiments of FIG. 2 to FIG. 3. For details, reference can be correspondingly made to the specific implementations of the embodiments of FIG. 2 to FIG. 3 in the method embodiments, and the details are not described herein again. The structure of the voice activity detection apparatus 40 or the voice activity detection device 60 is merely an example provided by this embodiment of this application, and the voice activity detection apparatus 40 or the voice activity detection device 60 may include more or fewer components than the components shown, two or more components may be combined, different configurations of component may be adopted.

An embodiment of this application further provides a storage medium, storing a plurality of instructions, the instructions being configured to be loaded by a processor to perform the operations in the voice activity detection method.

According to the embodiments of this application, after speech data is received and energy and spectral entropy of a frame of speech signal are determined, a square root of the energy of the speech signal is calculated and/or a square root of the spectral entropy of the speech signal is calculated; and a spectral entropy-energy square root of the speech signal is determined based on at least one of the square root of the energy and the square root of the spectral entropy; and whether the speech signal is a voiced frame is determined based on the spectral entropy-energy square root. Because the spectral entropy-energy square root can combine the time domain and frequency domain characteristics more closely, this application resolves the problem that in the related technology, the solution based on short-term energy and spectral entropy has low endpoint detection accuracy because the setting of a threshold greatly affected by the recording environment and a single feature is easily affected by noise, and also resolves the technical problem that the solution based on spectral entropy-energy product in which time domain and frequency domain characteristics are not combined closely fails to effectively reflect characteristics of voiced frames and cannot accurately detect voiced segments, thereby greatly improving accuracy of speech detection.

Persons of ordinary skill in the art should understand that all or some of the processes of the method according to the method embodiments of the present invention may be implemented by a program instructing relevant hardware. The program may be stored in a computer readable storage medium. When the program is run, the processes of the method according to the embodiments are performed. The storage medium may be a magnetic disk, a compact disk, a read-only memory (ROM), a random access memory (RAM), or the like.

The foregoing descriptions are merely exemplary embodiments of this application, but are not intended to limit the scope of this application. Any equivalent replacement made according to the appended claims of this application should fall within the scope of this application.

What is claimed is:

1. A voice activity detection method, executed by a smart terminal and comprising:
    receiving speech data, the speech data including a multi-frame speech signal, the multi-frame speech signal including a $k^{th}$ frame speech signal;
    determining energy and spectral entropy of the $k^{th}$ frame speech signal;
    calculating a square root of the energy of the $k^{th}$ frame speech signal and/or calculating a square root of the spectral entropy of the $k^{th}$ frame speech signal;

determining a spectral entropy-energy square root HE(k) of the $k^{th}$ frame speech signal based on at least one of the square root of the energy and the square root of the spectral entropy,
wherein the spectral entropy-energy square root HE(k) of the $k^{th}$ frame speech signal is determined according to HE(k)=$\sqrt{|H(k)-H(0)|}$*E(k), wherein $$H(0) = \frac{1}{N}\sum_{l=1}^{N} H(l),$$

H(k) is a spectral entropy of the $k^{th}$ frame speech signal, E(k) is a short-term energy of the spectral entropy of the $k^{th}$ frame speech signal, k is greater than N, and N represents first N frames in the multi-frame speech signal; and
determining that the $k^{th}$ frame speech signal is an unvoiced frame if the spectral entropy-energy square root of the $k^{th}$ frame speech signal is less than a first threshold, or that the $k^{th}$ frame speech signal is a voiced frame if the spectral entropy-energy square root of the $k^{th}$ frame speech signal is greater than or equal to the first threshold,
wherein the first threshold is adjusted by: multiplying a spectral entropy-energy square root average value HE(0) of first N frames and a special entropy H(0) of the first N frames by a coefficient β if spectral entropy-energy square roots of consecutive P frames speech signal are less than the first threshold, the coefficient β being greater than 0 and less than 1.

2. The method according to claim 1, wherein the determining a spectral entropy-energy square root of the speech signal based on at least one of the square root of the energy and the square root of the spectral entropy comprises:
multiplying the square root of the energy by the spectral entropy of the speech signal, to obtain the spectral entropy-energy square root of the frame of the speech signal.

3. The method according to claim 1, wherein the determining a spectral entropy-energy square root of the speech signal based on at least one of the square root of the energy and the square root of the spectral entropy comprises:
multiplying the square root of the spectral entropy by the energy of the speech signal, to obtain the spectral entropy-energy square root of the frame of the speech signal.

4. The method according to claim 1, wherein the determining a spectral entropy-energy square root of the speech signal based on at least one of the square root of the energy and the square root of the spectral entropy comprises:
multiplying the square root of the energy by the square root of the spectral entropy, to obtain the spectral entropy-energy square root of the frame of the speech signal.

5. The method according to claim 1,
wherein the first threshold comprises αHE(0), and a value range of α comprises [1,2].

6. The method according to claim 5, further comprising:
determining the spectral entropy-energy square root average value according to $$HE(0) = \frac{1}{N}\sum_{l=1}^{N} HE(l)', HE(l)' = \sqrt{H(l)*E(l)},$$

wherein H(l) is a spectral entropy of an $l^{th}$ frame of speech signal, and E(l) is short-term energy of the spectral entropy of the $l^{th}$ frame of speech signal.

7. The method according to claim 5, wherein after the determining a spectral entropy-energy square root average value HE(0) of the first N frames in the multi-frame speech signal, the method further comprises:
determining a variance of the first N frames in the speech signal; and if the variance is greater than a second threshold, performing the operation of determining a spectral entropy-energy square root average value HE(0) of the first N frames in the speech signal again.

8. The method according to claim 1, wherein after the determining that the frame of the speech signal is a voiced frame if the spectral entropy-energy square root of the speech signal is greater than or equal to the first threshold, the method further comprises:
if consecutive M frames of speech signals are the voiced frames, determining that speech begins, the first frame of speech signal in the M frames of speech signals being the first voiced frame.

9. The method according to claim 1, wherein after the determining that the frame of the speech signal is an unvoiced frame if the spectral entropy-energy square root of the speech signal is less than a first threshold, the method further comprises:
if consecutive R frames of speech signals are unvoiced frames, determining that a speech ends.

10. The method according to claim 1, wherein after the determining that the frame of the speech signal is an unvoiced frame if the spectral entropy-energy square root of the speech signal is less than a first threshold, the method further comprises:
if there are no two adjacent frames that are voiced frames in consecutive R frames of speech signals, determining that a speech ends.

11. The method according to claim 1, wherein after the determining energy and spectral entropy of a frame of speech signal, the method further comprises:
discarding the speech signal if the energy of the speech signal is greater than a second threshold; or
discarding the speech signal if the energy of the speech signal is less than a third threshold.

12. The method according to claim 1, further comprising:
passing the speech signal through a high pass filter.

13. The method according to claim 1, further comprising:
performing direct current removal on the $k^{th}$ frame of speech signal.

14. The method according to claim 1, wherein the multi-frame speech signal includes two adjacent frames, and the two adjacent frames share an overlapping area of acquisition points.

15. A voice activity detection apparatus, comprising: a memory storing computer program instructions; and a processor coupled to the memory and configured to execute the computer program instructions and perform:
receiving speech data, the speech data including a multi-frame speech signal, the multi-frame speech signal including a $k^{th}$ frame speech signal;
determining energy and spectral entropy of the $k^{th}$ frame speech signal;
calculating a square root of the energy the $k^{th}$ frame of the speech signal and/or calculate a square root of the spectral entropy the $k^{th}$ frame speech signal;

determining a spectral entropy-energy square root HE(k) of the $k^{th}$ frame speech signal based on at least one of the square root of the energy and the square root of the spectral entropy, wherein the spectral entropy-energy square root HE(k) of the $k^{th}$ frame speech signal is determined according to HE(k)=$\sqrt{|H(k)-H(0)|}$*E(k), wherein $$H(0) = \frac{1}{N}\sum_{l=1}^{N} H(l),$$

H(k) is a spectral entropy of the $k^{th}$ frame speech signal, E(k) is a short-term energy of the spectral entropy of the $k^{th}$ frame speech signal, k is greater than N, and N represents first N frames in the multi-frame speech signal; and determining that the $k^{th}$ frame speech signal is an unvoiced frame if the spectral entropy-energy square root of judging unit is less than a first threshold; or that the $k^{th}$ frame speech signal is a voiced frame if the spectral entropy-energy square root of the $k^{th}$ frame speech signal is greater than or equal to the first threshold, wherein the first threshold is adjusted by: multiplying a spectral entropy-energy square root average value HE(0) of first N frames and a special entropy H(0) of the first N frames by a coefficient β if spectral entropy-energy square roots of consecutive P frames speech signal are less than the first threshold, the coefficient β being greater than 0 and less than 1.

16. The apparatus according to claim 15, wherein the processor is further configured to execute the computer program instructions and perform:

multiplying the square root of the energy by the square root of the spectral entropy, to obtain the spectral entropy-energy square root of the frame of the speech signal.

17. The apparatus according to claim 15, wherein the processor is further configured to execute the computer program instructions and perform:

determining a spectral entropy-energy square root average value HE(0) of the first N frames in the multi-frame speech signal, wherein the first threshold comprises αHE(0), a value range of α comprising [1,2].

18. A voice activity detection device, comprising a processor and a memory connected to each other, the memory being configured to store application code, and the processor being configured to call the application code to execute:

receiving speech data, the speech data comprising a multi-frame speech signal, the multi-frame speech signal including a $k^{th}$ frame speech signal;

determining energy and spectral entropy of the $k^{th}$ frame speech signal;

calculating a square root of the energy of the $k^{th}$ frame speech signal and/or calculating a square root of the spectral entropy the $k^{th}$ frame speech signal;

determining a spectral entropy-energy square root HE(k) of the $k^{th}$ frame speech signal based on at least one of the square root of the energy and the square root of the spectral entropy, wherein the spectral entropy-energy square root HE(k) of the $k^{th}$ frame speech signal is determined according to HE(k)=$\sqrt{|H(k)-H(0)|}$*E(k), wherein $$H(0) = \frac{1}{N}\sum_{l=1}^{N} H(l),$$

H(k) is a spectral entropy of the $k^{th}$ frame speech signal, E(k) is a short-term energy of the spectral entropy of the $k^{th}$ frame speech signal, k is greater than N, and N represents first N frames in the multi-frame speech signal; and determining that the $k^{th}$ frame speech signal is an unvoiced frame if the spectral entropy-energy square root of the $k^{th}$ frame speech signal is less than a first threshold; or determining that the $k^{th}$ frame speech signal is a voiced frame if the spectral entropy-energy square root of the $k^{th}$ frame speech signal is greater than or equal to the first threshold, wherein the first threshold is adjusted by: multiplying a spectral entropy-energy square root average value HE(0) of first N frames and a special entropy H(0) of the first N frames by a coefficient β if spectral entropy-energy square roots of consecutive P frames speech signal are less than the first threshold, the coefficient β being greater than 0 and less than 1.

19. The device according to claim 18, wherein the processor is configured to call the application code to execute:

multiplying the square root of the energy by the square root of the spectral entropy, to obtain the spectral entropy-energy square root of the frame of the speech signal.

20. The device according to claim 18, wherein the processor is configured to call the application code to execute:

determining that a speech ends if there are no two adjacent frames that are voiced frames in consecutive R frames of speech signals.

* * * * *